United States Patent
Teslenko

(10) Patent No.: US 10,306,211 B2
(45) Date of Patent: May 28, 2019

(54) REMOTE CONTROL OF PIVOTABLE STEREOSCOPIC CAMERA

(71) Applicant: TELEFONAKTIEBOLAGET LM ERICSSON (PUBL), Stockholm (SE)

(72) Inventor: Maxim Teslenko, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 15/311,682

(22) PCT Filed: May 27, 2014

(86) PCT No.: PCT/SE2014/050648
§ 371 (c)(1),
(2) Date: Nov. 16, 2016

(87) PCT Pub. No.: WO2015/183145
PCT Pub. Date: Dec. 3, 2015

(65) Prior Publication Data
US 2017/0094261 A1 Mar. 30, 2017

(51) Int. Cl.
*H04N 7/00* (2011.01)
*H04N 13/296* (2018.01)
(Continued)

(52) U.S. Cl.
CPC ....... *H04N 13/296* (2018.05); *H04N 5/23203* (2013.01); *H04N 5/23219* (2013.01);
(Continued)

(58) Field of Classification Search
CPC .... H04N 13/296; H04N 13/239; H04N 13/30; H04N 13/243; H04N 5/23203; H04N 5/23219; H04N 5/23238; H04N 5/23296; H04N 7/181; G08B 13/1963

USPC .......................................................... 348/38
See application file for complete search history.

(56) References Cited

U.S. PATENT DOCUMENTS 5,905,525 A * 5/1999 Ishibashi ................ H04N 5/232
348/39
6,102,832 A 8/2000 Tani
(Continued)

FOREIGN PATENT DOCUMENTS

| CN | 101316550 A | 12/2008 |
|---|---|---|
| CN | 202587217 U | 12/2012 |
| WO | 2010002237 A2 | 1/2010 |

OTHER PUBLICATIONS

International Search Report and Written Opinion dated Aug. 13, 2014 in related International Application No. PCT/SE2014/050648.
(Continued)

*Primary Examiner* — Joseph G Ustaris
*Assistant Examiner* — Matthew David Kim
(74) *Attorney, Agent, or Firm* — Patent Portfolio Builders PLLC

(57) ABSTRACT

A camera device and a display device are configured to enable changing direction of capturing a stereoscopic image using a camera pair, according to an operator's motion. The camera device includes a rotatable camera base on which the stereoscopic camera pair is mounted, a motor configured to rotate the camera base, and a communication interface arranged to receive a movement signal corresponding to the operator's motion. The display device transmits the movement signal to enable the camera device to align the image capture direction with the operator view, receives stereoscopic images covering more than the operator view from the camera device, and displays a sector of the stereoscopic images corresponding to the operator view.

18 Claims, 5 Drawing Sheets

(51) Int. Cl.
*H04N 13/243* (2018.01)
*H04N 7/18* (2006.01)
*H04N 5/232* (2006.01)
*H04N 13/30* (2018.01)
*H04N 13/239* (2018.01)
*G08B 13/196* (2006.01)

(52) U.S. Cl.
CPC ..... *H04N 5/23238* (2013.01); *H04N 5/23296* (2013.01); *H04N 7/181* (2013.01); *H04N 13/239* (2018.05); *H04N 13/243* (2018.05); *H04N 13/30* (2018.05); *G08B 13/1963* (2013.01)

(56) References Cited

U.S. PATENT DOCUMENTS

| | | | | |
|---|---|---|---|---|
| 7,151,558 | B1* | 12/2006 | Kogane | G08B 13/19608 |
| | | | | 348/151 |
| 9,198,728 | B2 | 12/2015 | Wang et al. | |
| 2001/0038413 | A1* | 11/2001 | Peleg | G06T 3/4038 |
| | | | | 348/36 |
| 2006/0256140 | A1* | 11/2006 | Turner | G09B 9/307 |
| | | | | 345/690 |
| 2007/0200933 | A1* | 8/2007 | Watanabe | G08B 13/19643 |
| | | | | 348/211.11 |
| 2010/0091090 | A1* | 4/2010 | Koyanagi | H04N 13/239 |
| | | | | 348/36 |
| 2011/0135291 | A1* | 6/2011 | Lee | H04N 5/232 |
| | | | | 396/58 |
| 2011/0310219 | A1* | 12/2011 | Kim | G08B 13/19643 |
| | | | | 348/36 |
| 2013/0128010 | A1* | 5/2013 | Kim | H04N 13/221 |
| | | | | 348/50 |
| 2014/0013361 | A1 | 1/2014 | Monari et al. | |
| 2015/0130915 | A1* | 5/2015 | More | H04N 13/128 |
| | | | | 348/57 |

OTHER PUBLICATIONS

Office Action in corresponding Chinese Application No. 201480079209.X dated Dec. 3, 2017.

* cited by examiner

REMOTE CONTROL OF PIVOTABLE STEREOSCOPIC CAMERA

TECHNICAL FIELD

The invention relates to stereoscopic imaging and more particularly to camera devices, a method, a computer program and a computer program product for controlling a camera device comprising a stereoscopic camera pair and corresponding display device.

BACKGROUND

Remote controlled stereoscopic camera devices are widely used for advanced remote control of equipment (e.g. robots, surgical systems, etc.) and surveillance.

The stereoscopic camera device comprises two cameras, displaced horizontally from one another, which are used to obtain two different views on a scene. The images from the two cameras are shown to respective eyes of a remote operator using a display device to create an impression of depth, i.e. a 3D image. When the operator turns his/her head, the cameras should also rotate to observe the scene from a different direction.

The time between detecting movement of a head of the operator and showing scene from right direction is called latency. The latency time has three main contributions: image processing delay, motor reaction time and network latency.

High latency destroys immersion effect for the operator, whereby many stereoscopic systems have a strong emphasis on achieving low latency. Image processing delay can be reduced by using light weight encoding algorithms or by increasing computational power of encoding hardware. Stronger motors are used to combat motor reaction time. Network latency is kept low by keeping operator relatively close to the cameras.

SUMMARY

According to a first aspect, it is provided a camera device comprising: a rotatable camera base; a motor connected to the camera base; a first camera and a second camera forming a first stereoscopic camera pair with a first image capture direction, the first camera and the second camera both being wide angle cameras and being mounted on the camera base; a communication interface arranged to receive a movement signal. The camera device is arranged to rotate the camera base based on the movement signal.

The camera device may further comprise: a processor connected to the communication interface and the motor; and a memory storing instructions that, when executed by the processor, causes the camera device to: receive the movement signal; control the motor to rotate the camera base based on the movement signal.

The first camera and the second camera may be further arranged to transmit images over the communication interface.

The movement signal may comprise an absolute angle and the camera device may be arranged to rotate the camera base by controlling the motor to align the first image capture direction to correspond to the absolute angle.

The movement signal may comprise a movement angle and the camera device may be arranged to rotate the camera base by controlling the motor to rotate the camera base an amount which corresponds to the movement angle.

Each one of the first camera and the second camera may provide a sufficiently wide angle image that an operator only views a subset of a resulting image at a time.

The camera device may further comprise a third camera and a fourth camera forming a second stereoscopic camera pair with a second image capture direction, the third camera and the fourth camera being mounted on the camera base. The movement signal then comprises an absolute angle and the camera device is arranged to rotate the camera base to select a stereoscopic camera pair having an image capture direction which is nearest to the absolute angle. Moreover, the camera device is arranged to control the motor to align the image capture direction of the selected stereoscopic camera pair with the absolute angle.

According to a second aspect, it is provided a method for controlling a camera device comprising a rotatable camera base, a motor connected to the camera base, a first camera and a second camera forming a first stereoscopic camera pair with a first image capture direction, the first camera and the second camera both being wide angle cameras and being mounted on the camera base, and a communication interface. The method is performed in the camera device and comprises the steps of: receiving a movement signal; controlling the motor to rotate the camera base based on the movement signal.

The method may further comprise the step of: transmitting images from the first camera and the second camera over the communication interface.

The movement signal may comprise an absolute angle and the step of controlling the motor may comprise controlling the motor to align the first image capture direction to correspond to the absolute angle.

The movement signal may comprises a movement angle and the step of controlling the motor may comprises controlling the motor to rotate the camera base an amount which corresponds to the movement angle.

Each one of the first camera and the second camera may provide a sufficiently wide angle image that an operator only views a subset of a resulting image at a time.

The camera device may further comprise a third camera and a fourth camera forming a second stereoscopic camera pair with a second image capture direction, the third camera and the fourth camera both being wide angle cameras and being mounted on the camera base. The movement signal then comprises an absolute angle and the method further comprises the step of: selecting a stereoscopic camera pair having an image capture direction which is nearest to the absolute angle. Furthermore, the step of controlling the motor then comprises controlling the motor to align the image capture direction of the selected stereoscopic camera pair with the absolute angle.

According to a third aspect, it is provided a camera device comprising: means for receiving a movement signal over a communication interface; means for controlling the motor to rotate a camera base of the camera device based on the movement signal, the camera base having mounted a first camera and a second camera forming a first stereoscopic camera pair with a first image capture direction, wherein both the first camera and the second camera are wide angle cameras.

According to a fourth aspect, it is provided a computer program for controlling a camera device comprising a rotatable camera base, a motor connected to the camera base, a first camera and a second camera forming a first stereoscopic camera pair with a first image capture direction, the first camera and the second camera both being wide angle cameras and being mounted on the camera base, and a communication interface. The computer program comprising computer program code which, when run on the camera device causes the camera device to: receive a movement signal; control the motor to rotate the camera base based on the movement signal.

According to a fifth aspect, it is provided a computer program product comprising a computer program according to the fourth aspect and a computer readable means on which the computer program is stored.

According to a sixth aspect, it is provided a display device comprising: a processor; and a memory storing instructions that, when executed by the processor, causes the display device to: receive stereoscopic images from a camera device, the stereoscopic images covering more than an operator view; detect a centre direction of the operator view; display a sector of the stereoscopic images on a display of the display device, the centre direction of the sector corresponding to a centre direction of the operator view; and transmit a movement signal to the camera device in order to align an image capture direction to the new centre direction of the operator view.

The instructions to transmit a movement signal may comprise instructions that, when executed by the processor, causes the display device to only transmit the movement signal is when a significant movement of the centre direction of the operator view is detected.

The display device may further comprise instructions that, when executed by the processor, causes the display device to repeat the mentioned instructions.

The instructions to detect a new centre direction may comprise instructions that, when executed by the processor, causes the display device to use a sensor to detect a head movement of an operator.

According to a seventh aspect, it is provided a display device comprising: means for receiving stereoscopic images from a camera device, the stereoscopic images covering more than an operator view; means for detecting a new centre direction of the operator view; means for displaying a sector of the stereoscopic images on a display of the display device, the centre direction of the sector corresponding to a centre direction of the operator view; and means for transmitting a movement signal to the camera device in order to align an image capture direction to the new centre direction of the operator view.

According to an eighth aspect, it is provided a method for showing stereoscopic images. The method is performed in a display device and comprises the steps of: receiving stereoscopic images from a camera device, the stereoscopic images covering more than an operator view; detecting a centre direction of the operator view; displaying a sector of the stereoscopic images on a display of the display device, the centre direction of the sector corresponding to a centre direction of the operator view; and transmitting a movement signal to the camera device in order to align an image capture direction to the centre direction of the operator view.

The step of transmitting a movement signal is in one embodiment only performed when a significant movement of the centre direction of the operator view is detected.

The method may be repeated.

The step of detecting a new centre direction may comprise using a sensor to detect a head movement of an operator.

According to a ninth aspect, it is provided a computer program for showing stereoscopic images. The computer program comprises computer program code which, when run on a display device causes the display device to: receive stereoscopic images from a camera device, the stereoscopic images covering more than an operator view; detect a new centre direction of the operator view; display a sector of the stereoscopic images on a display of the display device, the centre direction of the sector corresponding to a centre direction of the operator view; and transmit a movement signal to the camera device in order to align an image capture direction to the new centre direction of the operator view.

According to a tenth aspect, it is provided a computer program product comprising a computer program according to the ninth aspect and a computer readable means on which the computer program is stored.

Using the solution of the camera device providing a wide angle image, the display device can respond to many operator movements virtually without latency, as long as the movement is within the scope of the wide angle image, thus requiring no new communication with the camera device for this initial adjustment. While this temporarily reduces depth, this is quickly remedied since the camera device commands the camera device to align to the new direction of the operator. This provides a great balance between immersion (due to the immediate response) and depth (due to the movement of the camera device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 3 is controlled based on a movement signal;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
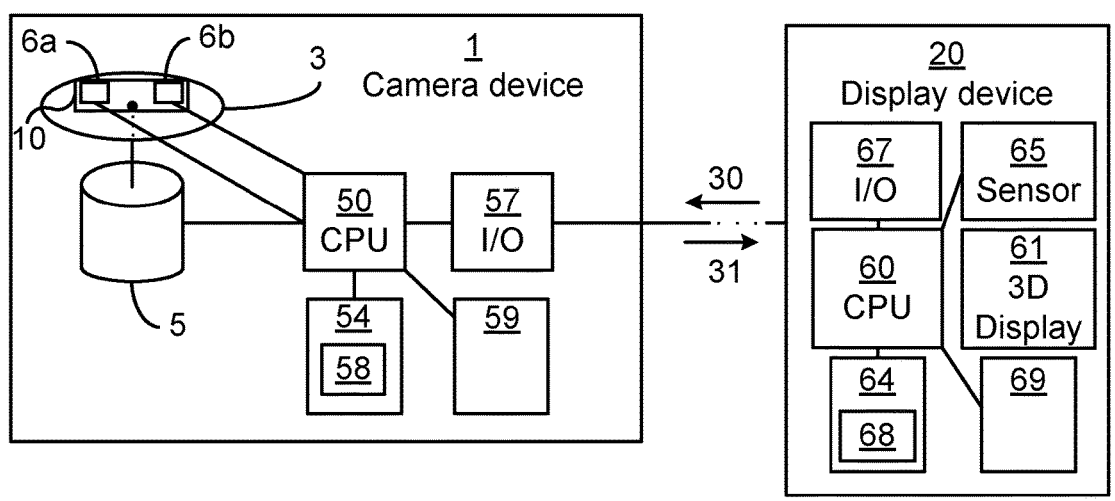
FIG. 1 is a schematic diagram showing some components of a camera device and a display device.

FIG. 1 is a schematic diagram showing some components of a camera device 1 and a display device 20. The camera device 1 comprises a rotatable camera base 3 and a motor 5 connected to the camera base 3. A first camera 6a and a second camera 6b are mounted with a horizontal displacement on the camera base 3. The first camera 6a and the second camera 6b together form a stereoscopic camera pair 10, allowing three dimensional (3D) image capture. The camera base 3 is any suitable structure suitable for mounting the camera devices 6a-b upon and which can be controlled by the motor 5 to rotate. The motor 5 is any suitable motor capable of rotating the camera base 3 to a suitable direction. For example, the motor 5 can be an electrical motor such as a DC (direct current) motor, e.g. a stepper motor.

A communication (Input/Output) interface 57 is provided to allow communication with the display device 20 using wireless or wired communication, e.g. over an Internet Protocol (IP) network. In this way, the camera device can transmit images 31 from the cameras 6a-b to the display device 20. Also, this allows the camera device 1 to receive movement signals 30 or other commands from the display device 20.

An optional processor 50 is provided using any combination of one or more of a suitable central processing unit (CPU), multiprocessor, microcontroller, digital signal processor (DSP), etc., capable of executing software instructions 58 stored in a memory 54, which can thus be a computer program product. The processor 50 can be configured to execute the method described with reference to FIGS. 5A-B below. The processor 50 is connected to the motor 5, the cameras 6a-b, the communication interface 57, the memory 54 and a data memory 59.

Alternatively, the method described with reference to FIGS. 5A-B below can be performed in the camera device without using software, i.e. using hardware, such as an Application Specific Integrated Circuit (ASIC) or discrete digital and/or analogue components. Also, hardware processing and software processing can be mixed.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

The data memory 59 is also provided for reading and/or storing data during execution of software instructions in the processor 50. The data memory 59 can be any combination of read and write memory (RAM) and read only memory (ROM).

Other components of the camera device 1 are omitted in order not to obscure the concepts presented herein.

The display device 20 comprises its own communication (Input/Output) interface 67 that is provided to allow communication with the camera device 1, e.g. for transmitting movement signals 30 and receiving images 31.

A processor 60 is provided using any combination of one or more of a suitable central processing unit (CPU), multiprocessor, microcontroller, digital signal processor (DSP), application specific integrated circuit etc., capable of executing software instructions 68 stored in a memory 64, which can thus be a computer program product. The processor 60 can be configured to execute the method described with reference to FIG. 6 below. The processor 60 is connected to the communication interface 67, the memory 64, a data memory 69 a 3D display 61 and an optional directional sensor 65. The sensor 65 can detect a direction of an operator, e.g. by sensing a rotation of a head of an operator by mounting the sensor 65 to the head or otherwise detecting head rotation of the operator.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

The data memory 69 is also provided for reading and/or storing data during execution of software instructions in the processor 60. The data memory 69 can be any combination of read and write memory (RAM) and read only memory (ROM).

A 3D display 61 is provided connected to the CPU 60. The 3D display 61 can be part of the display device 20 or external to the display device 20, such as in an operator worn device. The 3D display 61 is capable of providing two stereoscopic images to provide a three dimensional image to a viewer of the 3D display 61. This can be provided using any existing or future 3D display technology, e.g. separate physical small displays for each eye, polarized images, temporal switched images, etc. Polarized images and switched images may require an operator to wear appropriate 3D glasses.

Other components of the display device 20 are omitted in order not to obscure the concepts presented herein.

In this way, images captured by the stereoscopic camera pair of the camera device are provided to the 3D display 61 of the display device 20. This allows an operator at the display device to experience 3D images of the remote location of the camera device 1.

Both the first camera and the second camera are wide angle cameras, providing a sufficiently wide angle image such that an operator only views an operator view being a subset of a resulting image at a time.

Since impression of depth is proportional to effective distance between two cameras it is not sufficient to place cameras statically in order to achieve 3D vision in all direction. The operator gets full impression of depth only in direction which is close to the image capture direction.

But here the two wide angle cameras 6a-b are placed on the rotatable camera base 3. Once the operator turns his or her head, (by X radians) this is sensed by the sensor 65 and the picture corresponding to the new direction is shown to him virtually immediately (X radians from the central direction), as long as this can be achieved using the wide angle images from the cameras 6a-b which are currently present in the display device 20. If the angle X is relatively large, the 3D picture might lack some depth in it. However, the sensor noticing the new direction also triggers the processor 60 to transmit a movement signal 30 to the camera device 1 to rotate the camera base 3 accordingly. While the camera base 3 is rotating, the operator view, being the section of the picture shown to the operator, also rotates in an opposite direction, to cancel out the rotation of the cameras. The centre direction of the operator view does not change, since the rotation actually occurs after the head turn. Once the cameras have turned completely, the operator once again observes a deep 3D picture of the scene.

In this way, when the operator makes a sharp head turn and stops in the new direction, he/she more or less instantly gets a picture from this direction (may be somewhat flat at first). Over time the direction of view stays the same for him (in case the head is not turned more) but the picture becomes gradually deeper as the cameras turn.

This provides an immersive 3D vision system for an operator, even when the latency would otherwise prevent such immersion.

Accordingly, the latency in the system will impact only how fast operator gets the fully deep picture with sharp head turning. With small head movement, the lost depth will be unnoticeable. For humans it takes some time to re-focus once we change direction of view, whereby temporal loss of depth after sharp head turn should not have major impact on immersive 3D feeling experienced by operator. Optionally, the camera device transmits a lower resolution image while the camera base 3 is in motion, since there is a delay to the eye adjustment anyway, thereby reducing bandwidth usage.

Moreover, the operator at the display device 20 can send a movement signal 30 (over the communication link) to the camera device 1 to rotate to alter its view. The camera device effects this by rotating the camera base 3, to thereby direct the stereoscopic camera pair to a new angle.

Figure 2:
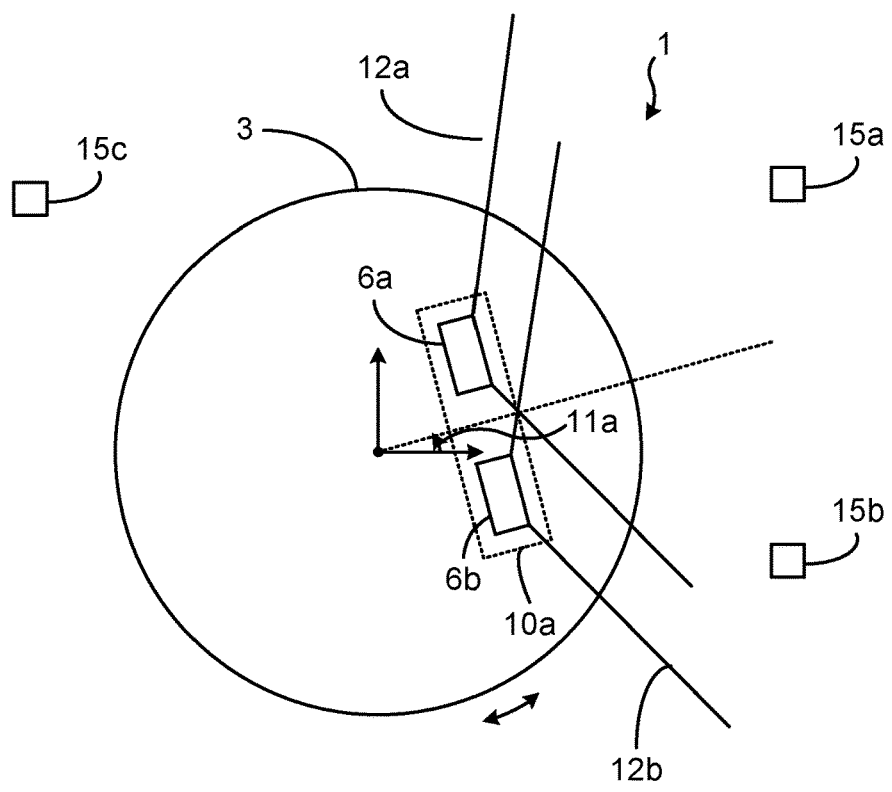
FIG. 2 is a schematic diagram illustrating a camera device according to one embodiment.

FIG. 2 is a schematic diagram illustrating a camera device according to one embodiment.

The camera base 3 of the camera device 1 is now seen from above and is rotatable around a coordinate system having its origin aligned with the axis of rotation of the camera base 3. A first stereoscopic camera pair 10a comprises a first camera 6a and the second camera 6b. The first stereoscopic camera pair 10a has a first image capture direction 11a which is defined in relation to the coordinate system. The first image capture direction 11a can be defined as the mean of the center directions of the two cameras 6a-b of the first stereoscopic camera pair. For instance, in an example where the center directions of the two cameras 6a-b are aligned, then the first image capture direction 11a is also aligned to this direction.

The first camera 6a has a first viewing angle 12a and the second camera 6b has a second viewing angle 12b. A first object 15a is within view of both cameras 6a-b. A second object is also within view of both cameras 6a-b. A third object 15c, however, is out of view for both cameras 6a-b.

Figure 4A:
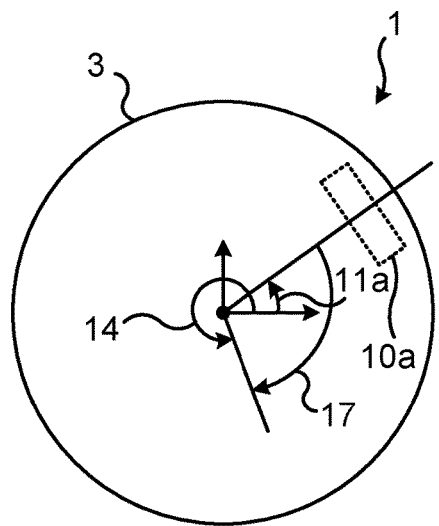
FIGS. 4A-C are schematic diagrams illustrating embodiments of how a camera device of FIG. 2
Figure 4B:
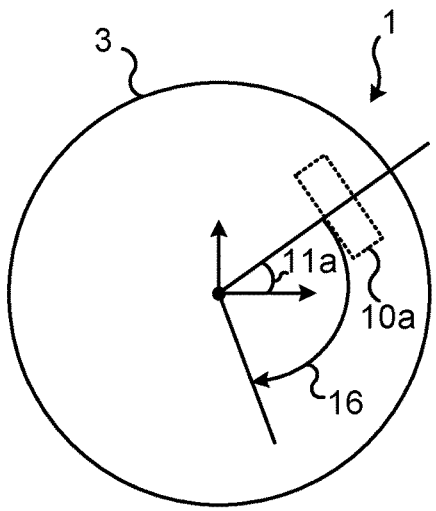

If an operator of the display device 20 connected to the camera device wants to see the third object 15c, a movement signal is sent to the camera device to rotate the camera base so that the cameras can capture images comprising the third object 15c, as shown in FIGS. 4A-B and explained in more detail below.

Figure 3:
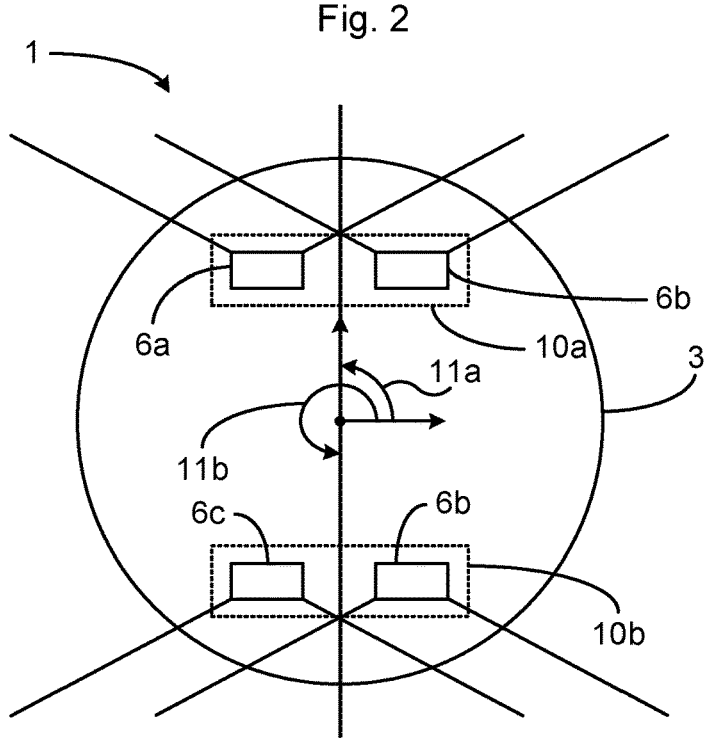
FIG. 3 is a schematic diagram illustrating a camera device according to one embodiment.

In FIG. 3, compared to FIG. 2, the camera device 1 comprises is a second stereoscopic camera pair bob comprising a third camera 6c and a fourth camera 6d. The second stereoscopic camera pair 10b has a second image capture direction 11b which is also defined in relation to the coordinate system. The second image capture direction 11b is defined analogously with the first image capture direction 11a.

The camera device 1 may comprise further camera pairs to further reduce any required movement angle and/or increase static viewing angles of the camera device 1.

Figure 4C:
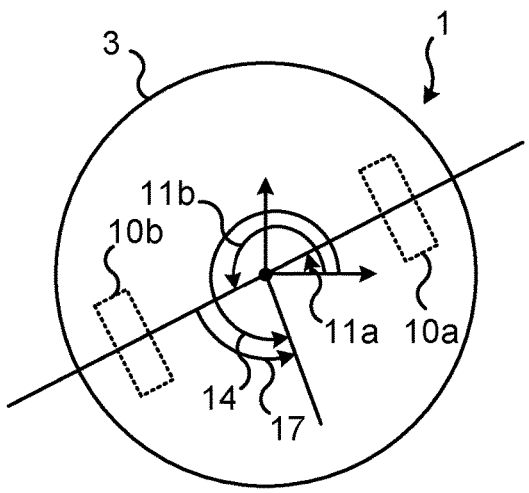

The operation of this embodiment is shown in FIG. 4C and explained in more detail below.

FIGS. 4A-B are schematic diagrams illustrating embodiments of how the camera device of FIG. 2 or 3 is controlled based on a movement signal.

In FIG. 4A, the movement signal comprises an absolute angle 14. Absolute angle is here to be construed as a non-relative angle. In other words, the absolute angle could be positive or negative. The camera device 1 then needs to align the first image capture direction 11a with the absolute angle 14 by rotating the camera base 3 with a differential angle 17. The differential angle is calculated as the difference between the first image capture direction 11a and the absolute angle 14. The differential angle 17 can be positive (implying anticlockwise rotation) or negative (implying clockwise rotation), whichever direction results in the shortest magnitude of the rotation angle. In this example, the differential angle is negative whereby the rotation is clockwise.

In FIG. 4B, the movement signal comprises a movement angle 16. This is a relative signal, whereby the camera device 1 controls the motor to rotate the camera base 3 with an amount which corresponds to the movement angle 16. The movement angle can be positive, resulting in an anticlockwise rotation, or negative, resulting in a clockwise rotation. In this example, the movement angle 16 is positive, resulting in a clockwise rotation.

In FIG. 4C, the camera device 1 comprises both a first stereoscopic camera pair 10a and a second stereoscopic camera pair 10b. In this way, when the display device sends a movement signal with an absolute direction, the camera device 1 selects the stereoscopic camera pair having an image capture direction which is nearest to the absolute angle 14. In this example, the second image capture direction 11b of the second stereoscopic camera pair 10b is closest to the absolute angle 14. The camera device 1 then controls the motor to align the image capture direction of the selected stereoscopic camera pair with the absolute angle 14. This is achieved by calculating a differential angle 17 between image capture direction of the selected stereoscopic pair and the absolute angle 14 and controlling a rotation of the camera base 3 in accordance with the differential angle 17.

In one embodiment, the camera device 1 transmits images captured from all cameras to the display device 20, whereby the display device can process and select what images should be shown on the 3D display.

In one embodiment, the camera device only transmits images from the stereoscopic camera pair which is active at the moment, which reduces the bandwidth requirements for the images 31 transmitted to the display device.

In one embodiment, the stereoscopic camera pair is only allowed to switch if the velocity of desired rotation is fast enough.

Figure 5A:
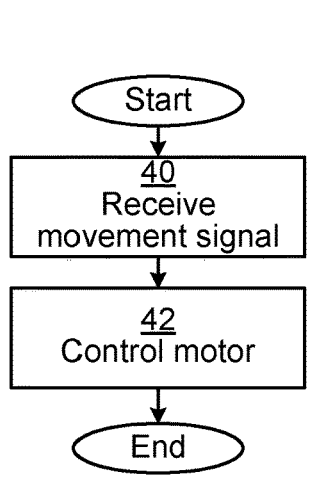
FIGS. 5A-B are flow charts illustrating methods performed in the camera device of FIG. 1 or 2 for controlling the camera device.
Figure 5B:
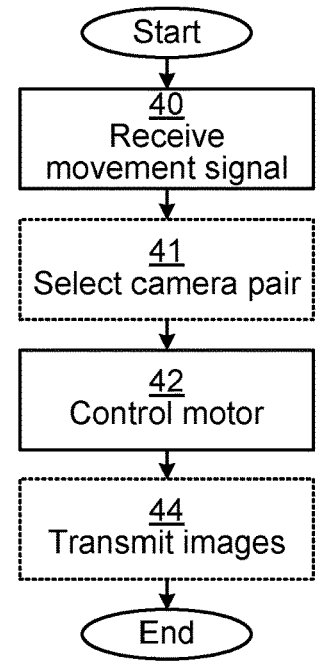

FIGS. 5A-B are flow charts illustrating methods performed in the camera device of FIG. 1, FIG. 2 or FIG. 3 for controlling the camera device.

In a receive movement signal step 40, a movement signal 30 is received from the display device 20. The movement signal 30 instructs the camera device to rotate the camera base upon which the cameras are mounted.

In one embodiment, the movement signal 30 comprises an absolute angle 14, i.e. instructing the camera device to align its view to the absolute angle 14.

In one embodiment, the movement signal 30 comprises a movement angle, which is a relative movement command, e.g. move x radians (or degrees), where x is a positive or negative number.

In a control motor step 42, the motor 5 is controlled to rotate the camera base 3 based on the movement signal 30.

When the movement signal 30 comprises an absolute angle 14, this step comprises controlling the motor to align the first image capture direction 11a to correspond to the absolute angle 14.

When the movement signal 30 comprises a movement angle, this step comprises controlling the motor to rotate the camera base an amount which corresponds to the movement angle.

FIG. 5B is a flow chart illustrating a method similar to the method illustrated in FIG. 5A. Only new or modified steps in relation to the method of FIG. 5A are explained here.

In an optional select camera pair step 41, a stereoscopic camera pair is selected which has an image capture direction which is nearest to the absolute angle. This step is only performed when the movement signal comprises an absolute angle, and the camera device comprises at least two stereoscopic camera pairs.

When the select camera pair step 41 is performed, the control motor step 42 comprises controlling the motor to align the image capture direction of the selected stereoscopic camera pair with the absolute angle.

In an optional transmit images step 44, images from the first camera 6a and the second camera 6b are transmitted over the communication interface 57, e.g. to the display device. Alternatively or additionally, images from another stereoscopic camera pair are also transmitted over the communication interface.

Figure 6:
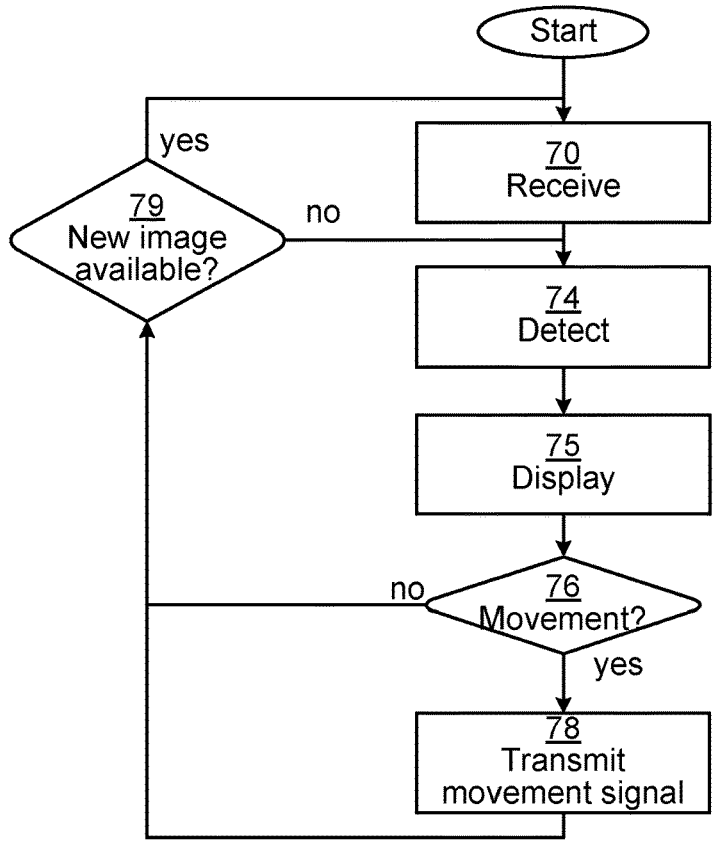
FIG. 6 is a flow chart illustrating a method performed in the display device of FIG. 1 for showing stereoscopic images according to one embodiment.

FIG. 6 is a flow chart illustrating a method performed in the display device of FIG. 1 for showing stereoscopic images according to one embodiment.

In a receive step 70, stereoscopic images are received from the camera device. The stereoscopic images cover more than an operator view. It is also here received the image capture direction of the stereoscopic images.

In a detect step 74, a new centre direction of the operator view is detected. This can e.g. be performed using the sensor 65 to detect a head movement of an operator.

In a display step 75, a sector of the last received stereoscopic images is displayed on the display 61 of the display device 20. The centre direction of the sector corresponds to a centre direction of the operator view. It is to be noted that the sector is a strict subset of the complete stereoscopic images. This step involves displaying two images on the 3D display 61.

In a conditional significant movement step 76, it is determined whether a significant movement of the centre direction of the operator view is detected. For instance, this can involve comparing the centre direction of the operator view of different iterations of the detect step. Alternatively or additionally, a significant movement is detected when the sector is closer to the border of the stereoscopic images than a threshold amount. Alternatively or additionally, a significant movement is detected when the centre direction of the sector deviates more than a threshold amount from the image capture direction. If there is significant movement, the method proceeds to a transmit movement signal step 78, otherwise, the method proceeds to a conditional new image available step 79.

In the transmit movement signal step 78, the movement signal is transmitted to the camera device 1 in order to align an image capture direction to the new centre direction of the operator view. As explained above, the movement signal can comprise an absolute angle or movement angle depending on how much processing the camera device 1 should perform.

After the transmit movement signal step, the method proceeds to the conditional new image available step 79.

In the conditional new image available step 79, it is determined whether there is a new stereoscopic image to be received. It is to be noted that the stereoscopic images can be received as a sequence of individual images or as a media stream. In either case, it is here determined whether a new stereoscopic image is ready to be received. If this is the case, the method returns to the receive step 70, otherwise, the method returns to the detect step 74 to continue dynamic tracking of operator movement.

Figure 7:
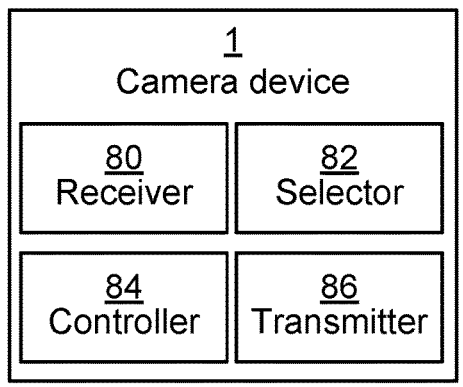
FIG. 7 is a schematic diagram showing functional modules of the camera device of FIG. 1 or 2.

FIG. 7 is a schematic diagram showing functional modules of the camera device 1 of FIG. 2 or 3. The modules are implemented using software instructions such as a computer program executing in the camera device 1. The modules correspond to the steps in the methods illustrated in FIGS. 5A-B.

A receiver 80 is arranged to receive a movement signal. This module corresponds to the receive movement signal 40 of FIGS. 5A-B.

A selector 82 is arranged to select the stereoscopic camera pair having an image capture direction which is nearest to an absolute angle when present in the movement signal. This module corresponds to the select camera pair step 41 of FIG. 5B.

A controller 84 is arranged to control the motor to rotate the camera base based on the movement signal. This module corresponds to the control motor step 42 of FIGS. 5A-B.

A transmitter 86 is arranged to transmit images from cameras of at least one stereoscopic camera pair to the display device. This module corresponds to the transmit images step 44 of FIG. 5B.

Figure 8:
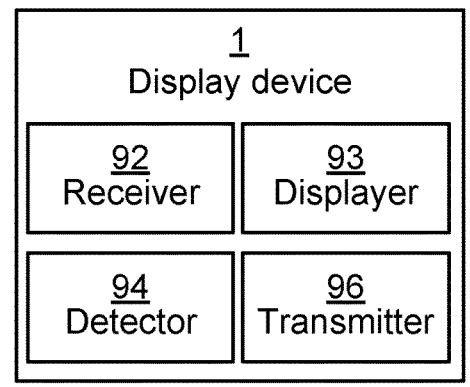
FIG. 8 is a schematic diagram showing functional modules of the display device of FIG. 1.

FIG. 8 is a schematic diagram showing functional modules of the display device of FIG. 1. The modules are implemented using software instructions such as a computer program executing in the display device 20. The modules correspond to the steps in the methods illustrated in FIG. 6.

A receiver 92 is arranged to receive stereoscopic images from a camera device. This module corresponds to the receive step of FIG. 6.

A displayer 93 is arranged to display a sector of the stereoscopic images on a display of the display device, the centre direction of the sector corresponding to a centre direction of the operator view. This module corresponds to the display step of FIG. 6.

A detector 94 is arranged to detect a centre direction of the operator view. This module corresponds to the detect step of FIG. 6.

A transmitter 96 is arranged to transmit a movement signal to the camera device in order to align an image capture direction to the new centre direction of the operator view. This module corresponds to the transmit movement signal step of FIG. 6.

Figure 9:
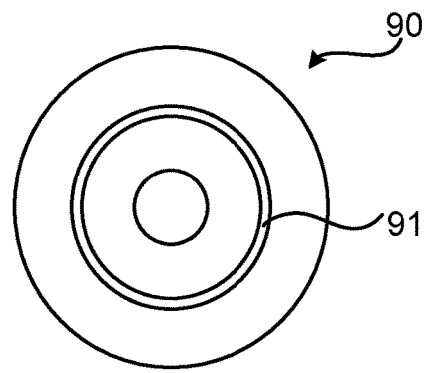
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program products 54 or 64 of FIG. 1.

While the computer program 91 is here schematically shown as a track on the depicted optical disk, the computer program can be stored in any way which is suitable for the computer program product, such as a removable solid state memory (e.g. a Universal Serial Bus (USB) drive).

It is to be noted that while the embodiments presented herein mainly describe horizontal movement, the same principles shown herein can equally well be applied to vertical movement as an alternative or in addition to horizontal movement.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A camera device comprising:
a rotatable camera base;
a motor connected to the camera base;
a first camera and a second camera forming a first stereoscopic camera pair with a first image capture direction, the first camera and the second camera both being wide angle cameras and being mounted on the camera base, wherein the first stereoscopic camera pair captures images that form a stereoscopic image covering a wider angle than an operator views at a time; and
a communication interface arranged to receive a movement signal corresponding to the operator's motion away from the first image capture direction and towards a new image capture direction;
wherein the camera base is rotated based on the movement signal away from the first image capture direction and towards the new image capture direction,
wherein when the first stereoscopic camera pair has the first image capture direction, the images that form the stereoscopic image are in the first image capture direction and provide an impression of depth in the first image capture direction,
wherein when the first stereoscopic camera pair has the new image capture direction, the images that form the stereoscopic image are in the new image capture direction and provide the impression of depth in the new image capture direction, and
wherein, during at least part of a duration during which the camera base is rotated based on the movement signal away from the first image capture direction and towards the new image capture direction, the images that form the stereoscopic image are in the new image capture direction with at least a partial loss of the perception of depth in the new image capture direction.

2. The camera device according to claim 1, further comprising:
a processor connected to the communication interface and the motor; and
a memory storing instructions that, when executed by the processor make the processor:
to receive the movement signal; and
to control the motor to rotate the camera base.

3. The camera device according to claim 1, wherein the first camera and the second camera are further configured to transmit images captured by the first stereoscopic camera pair over the communication interface.

4. The camera device according to claim 1, wherein the movement signal comprises an absolute angle, and wherein the motor rotates the camera base so as to align the first image capture direction to correspond to the absolute angle.

5. The camera device according to claim 1, wherein the movement signal comprises a movement angle and the motor rotates the camera base with an amount which corresponds to the movement angle.

6. The camera device according to claim 1, further comprising a third camera and a fourth camera forming a second stereoscopic camera pair with a second image capture direction, the third camera and the fourth camera being mounted on the camera base;
wherein the movement signal comprises an absolute angle and the first or the second stereoscopic camera pair is selected depending on whether the first image capture direction or the second image capture direction is nearest to the absolute angle; and
the motor rotates the camera base to align the first or second image capture direction of the selected first or second stereoscopic camera pair to correspond to the absolute angle.

7. A method for controlling an image capturing direction of a camera device according to an operator's motion, the camera device including a rotatable camera base, a motor connected to the camera base, a first camera and a second camera forming a first stereoscopic camera pair with a first image capture direction, the first camera and the second camera both being wide angle cameras and being mounted on the camera base, wherein the first stereoscopic camera pair captures images that form a stereoscopic image covering a wider angle than the operator views at a time, and a communication interface, the method comprising:
receiving, by the communication interface, a movement signal corresponding to the operator's motion away from the first image capture direction and towards a new image capture direction; and
controlling the motor to rotate the camera base based on the movement signal away from the first image capture direction and towards the new image capture direction,
wherein when the first stereoscopic camera pair has the first image capture direction, the images that form the stereoscopic image are in the first image capture direction and provide an impression of depth in the first image capture direction,
wherein when the first stereoscopic camera pair has the new image capture direction, the images that form the stereoscopic image are in the new image capture direction and provide the impression of depth in the new image capture direction, and
wherein, during at least part of a duration during which the camera base is rotated based on the movement signal away from the first image capture direction and towards the new image capture direction, the images that form the stereoscopic image are in the new image capture direction with at least a partial loss of the perception of depth in the new image capture direction.

8. The method according to claim 7, further comprising:
transmitting images captured by the first camera and the second camera over the communication interface.

9. The method according to claim 7, wherein the movement signal comprises an absolute angle and wherein the controlling is performed to align the first image capture direction to correspond to the absolute angle.

10. The method according to claim 7, wherein the movement signal comprises a movement angle and wherein the controlling operates the motor to rotate the camera base an amount which corresponds to the movement angle.

11. The method according to claim 7, wherein
the camera device further comprises a third camera and a fourth camera forming a second stereoscopic camera pair with a second image capture direction, the third camera and the fourth camera both being wide angle cameras and being mounted on the camera base;
the movement signal comprises an absolute angle, and
the method further comprises selecting the first stereoscopic camera pair or the second stereoscopic camera pair depending on whether the first or the second image capture direction is nearest to the absolute angle; and
wherein the controlling is performed to operate the motor so as to align the first or second image capture direction of the selected first or second stereoscopic camera pair to correspond to the absolute angle.

12. The method according to claim 7, further comprising:
receiving the images that form the stereoscopic image from the camera device, the stereoscopic image covering more than an operator view;
detecting a new centre direction of the operator view away from the first image capture direction and towards the new image capture direction; and
displaying a sector of the stereoscopic image.

13. The method according to claim 12, wherein the receiving of the images that form the stereoscopic image, the detecting the new centre direction and the displaying of the sector of the stereoscopic image are performed by a display device, which is also configured to detect the operator's motion and transmits the motion signal to the camera device.

14. The method according to claim 7, wherein the motion signal is received when the operator's motion rotates a minimum amount.

15. A display device comprising:
a processor;
a display; and
a non-transitory computer readable medium storing instructions that, when executed by the processor make the processor:
to receive stereoscopic images from a camera device, the stereoscopic images covering more than an operator view;
to detect a first centre direction of the operator view and a movement thereof away from the first centre direction and towards a new centre direction;
to trigger displaying a sector of the stereoscopic images on the display so that a centre direction of the sector corresponds to the new centre direction of the operator view; and
to transmit a movement signal corresponding to an operator's motion to the camera device to enable the camera device to align an image capture direction according to the new centre direction of the operator view.

16. The display device according to claim 15, wherein the movement signal is transmitted only when the movement of the first centre direction away from the first centre direction and towards the new centre direction is significant as to degrade the operator view.

17. The display device according to claim 15, wherein the instructions make the processor to receive stereoscopic images, to detect the first centre direction and the movement away from the first centre direction and towards the new centre direction, to trigger displaying and to transmit the movement signal repeatedly.

18. The display device according to claim 15, wherein the processor detects the motion based on signals received from a motion sensor configured to detect a head movement of an operator.

* * * * *